WILLIAM W. SPEER.
Improvement in Combined Sub-soil Drill and Hill-side Plows.
No. 119,423. Patented Sep. 26, 1871.
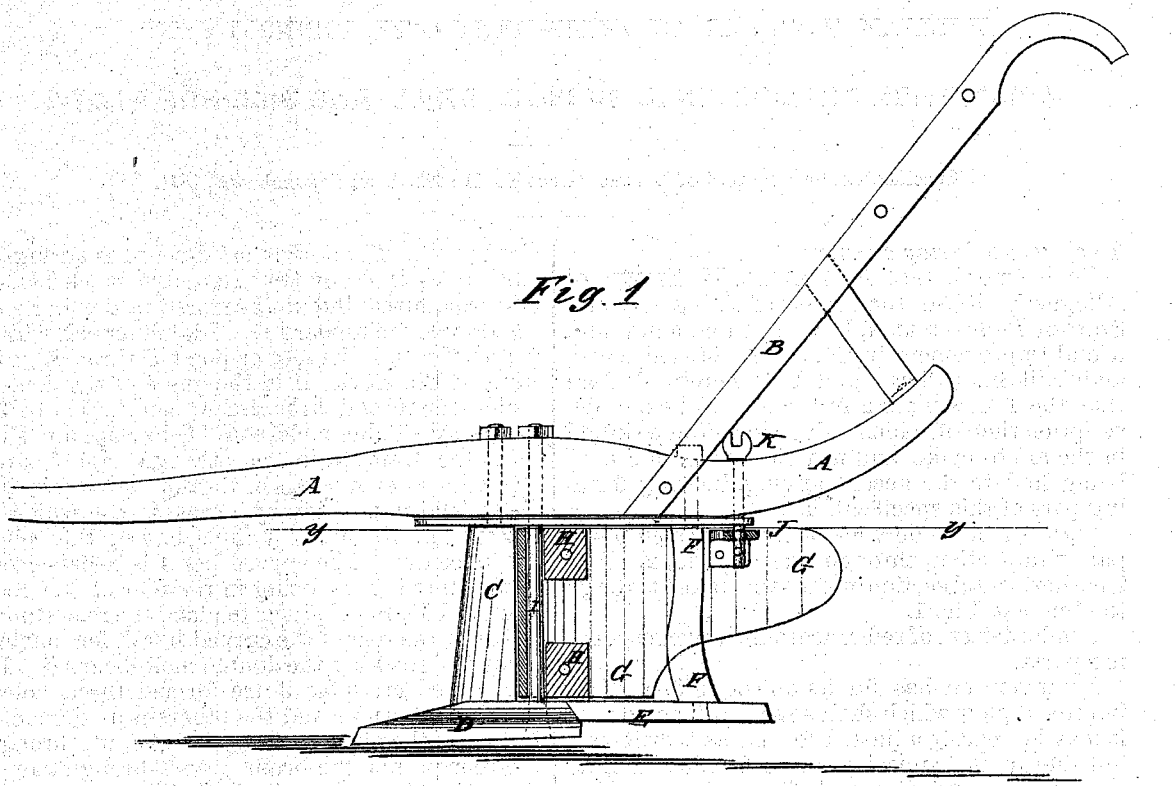
Fig. 1
Fig. 2
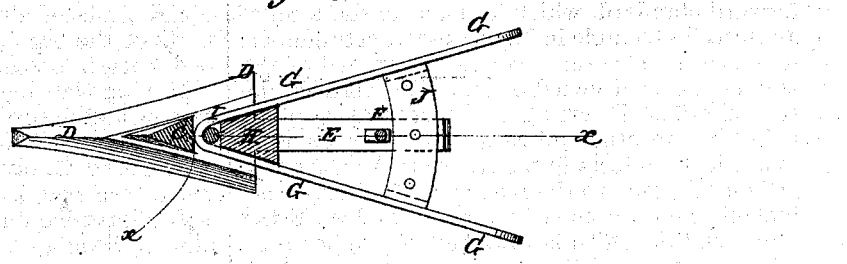

UNITED STATES PATENT OFFICE.

WILLIAM W. SPEER, OF ALLEGHENY CITY, PENNSYLVANIA.

IMPROVEMENT IN COMBINED SUBSOIL, DRILL, AND SIDE-HILL PLOWS.

Specification forming part of Letters Patent No. 119,423, dated September 26, 1871.

*To all whom it may concern:*

Be it known that I, WILLIAM W. SPEER, of Allegheny city, in the county of Allegheny and State of Pennsylvania, have invented a new and useful Improvement in Combined Subsoil, Drill, and Hill-Side Plow; and I do hereby declare that the following is a full, clear, and exact description thereof, which will enable others skilled in the art to make and use the same, reference being had to the accompanying drawing forming part of this specification.

Figure 1 is a side view of my improved plow, partly in section, through line $x\ x$, Fig. 2. Fig. 2 is a horizontal section of the same taken through the line $y\ y$, Fig. 1.

Similar letters of reference indicate corresponding parts.

My invention has for its object to furnish an improved plow which shall be so constructed that it may be readily adjusted for use as a drill, as a hill-side, or as a subsoil-plow, and which shall be simple in construction and effective in operation in either capacity.

A is the plow-beam, to the rear part of which the handles B are securely attached. C is the forward standard, which is made in the form of an isosceles triangle in its cross-section to adapt it to serve as a colter. To the lower end of the standard C is attached or upon it is formed the subsoiler-foot D, which also serves as a plow-point in the other adjustments. E is a sole or foot, which projects to the rearward from the foot or point D, and to the rear part of which is attached the lower end of the rear standard F, the upper end of which is attached to the beam A. As thus described the machine is a subsoil-plow. G is the double mold-board, which is made with vertical sides, and which is formed by bending to the desired angle a steel plate cut into the desired form. The double mold-board is strengthened at its angle by two triangular blocks, H, of cast-iron, fitted into and secured in the angle of the double mold-board G. I is a long bolt which passes through the foot or point D through or in front of the blocks H in the angle of the double mold-board G and through the beam A. The bolt I pivots the double mold-board G in place and sustains the draft strain upon the said mold-board. The rear parts or wings of the double mold-board G are held in position by a cross-bar, J, which is curved into the arc of a circle, having the bolt I for its center. The curved bar J is represented in the drawing as being in the rear of the rear standard F; but I prefer to place the rear standard F in the rear of the curved bar J, for convenience in detaching the double mold-board G. In the curved cross-bar J are formed three holes, one in the center and the others near the ends, to receive the pins K, which passes down through the rear part of the beam A and through one or the other of the holes in the bar J.

To adjust the plow to serve as a drill the pin K is passed through the center hole of the bar J. To adjust the plow for side-hill plowing the pin K is placed alternately in the hole in the end parts of the bar J, according as the furrow is to be turned in one or the other direction.

Having thus described my invention, I claim as new and desire to secure by Letters Patent—

The perpendicularly-sided and triangular mold-board G, pivoted at the vertex of its angle to the bolt I of subsoil-plow irons C D E, and adjustable on the arc-bar J to enable the plow to be adapted to the uses specified.

WILLIAM W. SPEER.

Witnesses:
FRANCIS TORRANCE,
JOHN S. SPEER.

(84)